(12) United States Patent
Coltrin

(10) Patent No.: US 6,385,836 B1
(45) Date of Patent: May 14, 2002

(54) METHOD FOR COMPOSITE MATERIAL REPAIR

(75) Inventor: David H. Coltrin, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/608,937

(22) Filed: Jun. 30, 2000

(51) Int. Cl.[7] .............................................. B22D 19/10
(52) U.S. Cl. ........................ 29/402.18; 29/530; 156/94; 156/285
(58) Field of Search ..................... 29/402.09, 402.18, 29/530; 156/94, 98, 285; 264/36.21, 571

(56) References Cited

U.S. PATENT DOCUMENTS

| | | | |
|---|---|---|---|
| 3,706,621 A | * | 12/1972 | Lichtman |
| 3,988,400 A | * | 10/1976 | Luhman ...................... 156/94 |
| 4,132,516 A | * | 1/1979 | Story |
| 4,208,456 A | | 6/1980 | Holmes ...................... 428/63 |
| 4,280,861 A | * | 7/1981 | Schwartz |
| 4,554,036 A | * | 11/1985 | Newsom |
| 4,851,169 A | * | 7/1989 | Lay et al. ...................... 156/94 |
| 4,942,013 A | * | 7/1990 | Palmer et al. |
| 5,092,376 A | | 3/1992 | Blankenship et al. ......... 141/25 |
| 5,738,741 A | * | 4/1998 | Crasto et al. .................. 156/94 |
| 6,149,749 A | * | 11/2000 | McBroom |

FOREIGN PATENT DOCUMENTS

| | | | | |
|---|---|---|---|---|
| DE | 3909560 A1 | 9/1990 | ........... | B29C/73/00 |
| FR | 2705914 | * | 2/1993 | |
| WO | WO 97/39879 | 10/1997 | ........... | B29C/73/02 |

OTHER PUBLICATIONS

International Search Report dated Jan. 30, 2002 for PCT/US 01/20258 filed Jun. 25, 2001.

* cited by examiner

Primary Examiner—S. Thomas Hughes
Assistant Examiner—Steven A Blount
(74) Attorney, Agent, or Firm—Baker Botts L.L.P.

(57) ABSTRACT

A method for repairing a composite material having an internal void includes identifying the location of the internal void and forming a single channel extending from a surface of the composite material to the internal void. The method further includes pulling a vacuum in the internal void and inserting a repair material through the channel into the internal void.

12 Claims, 2 Drawing Sheets

METHOD FOR COMPOSITE MATERIAL REPAIR

TECHNICAL FIELD OF THE INVENTION

This invention relates generally to the field of composite materials and more particularly to a method for composite material repair.

BACKGROUND OF THE INVENTION

Many manufacturing processes today call for the fabrication of components from "composite" materials, also known as fiber-reinforced polymers. Fiber-reinforced polymers are comprised of reinforcing fibers that are positioned in a polymer matrix. Commonly, the reinforcing fibers are fiberglass, although high strength fibers such as aramid and carbon are used in advanced applications, such as aerospace applications. The polymer matrix is typically a thermoset resin, such as polyester, vinyl ester, or epoxy. Specialized resins, such as, phenolic, polyurethane and silicone are used for certain applications.

Composite materials may be formed using numerous types of fabrication process. One such process is a wet lay-up process. In a wet lay-up process, layers of dry reinforcing fiber are laid on a mold by hand or by a placement machine. Liquid resin is then poured on the fiber materials such that the resin fills the spaces between the fibers. The materials may then be cured at room temperature or in an autoclave and the liquid resin turns into a solid thermoset. The fibers are thus embedded in the solid thermoset resin and reinforce the resin. Alternatively, layers of fibers can be pre-impregnated with resin and then partially cured to form layers of "prepreg" material. After this partial curing, the resin has not completely set and the prepreg layers are flexible and can be shaped in or around a mold or forming tool. Once the prepreg layers are so shaped, the prepreg is then completely cured in an autoclave to form a fiber-reinforced laminate.

A common defect associated with composite structures is air inclusions or voids located inside the composite material. Such voids weaken the composite material and sometimes must be repaired. Another scenario requiring repair is when the composite material is impacted during service, resulting in delamination or delaminations between layers of the material. Such damage is typically referred to as interlaminar defects or interlaminar damage.

One type of repair for voids and interlaminar defects is resin injection. During one type of resin injection repair, two holes are drilled through the composite material to the void or delamination inside the composite material. The two holes are typically drilled at opposite ends of the defect. Resin is then either driven into one hole using pressure until it exits the second hole, or resin is drawn into one hole by applying a vacuum to the second hole. When using such a two-hole process, air entrapment in the void is common and therefore the resin does not completely fill the void. In addition, since two holes must be drilled in the structure, the already weak structure is further weakened.

SUMMARY OF THE INVENTION

In accordance with the present invention, a method for composite material repair is provided that substantially eliminates or reduces disadvantages or problems associated with previously developed methods. In particular, the present invention contemplates a method of repairing a void in a composite material using a repair material injected into the void through a single channel.

In one embodiment of the present invention, a method for repairing a composite material having an internal void includes identifying the location of the internal void and forming a single channel extending from a surface of the composite material to the internal void. The method further includes pulling a vacuum in the internal void and inserting a repair material through the channel into the internal void.

Technical advantages of the present invention include a method for composite material repair that provides an improved method of repairing voids in composite materials over the prior art. Unlike the prior art, the present invention only requires the formation of one hole or channel in the composite material, and thus minimal additional damage is caused by the repair process. Furthermore, the method of the present invention allows the creation of a complete or almost complete vacuum in the void, causing most of the air molecules to be removed from the void before the repair material is injected. Therefore, the amount of air remaining in the void after the repair material has been injected is minimized and the void is entirely or almost entirely filled with the repair material.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
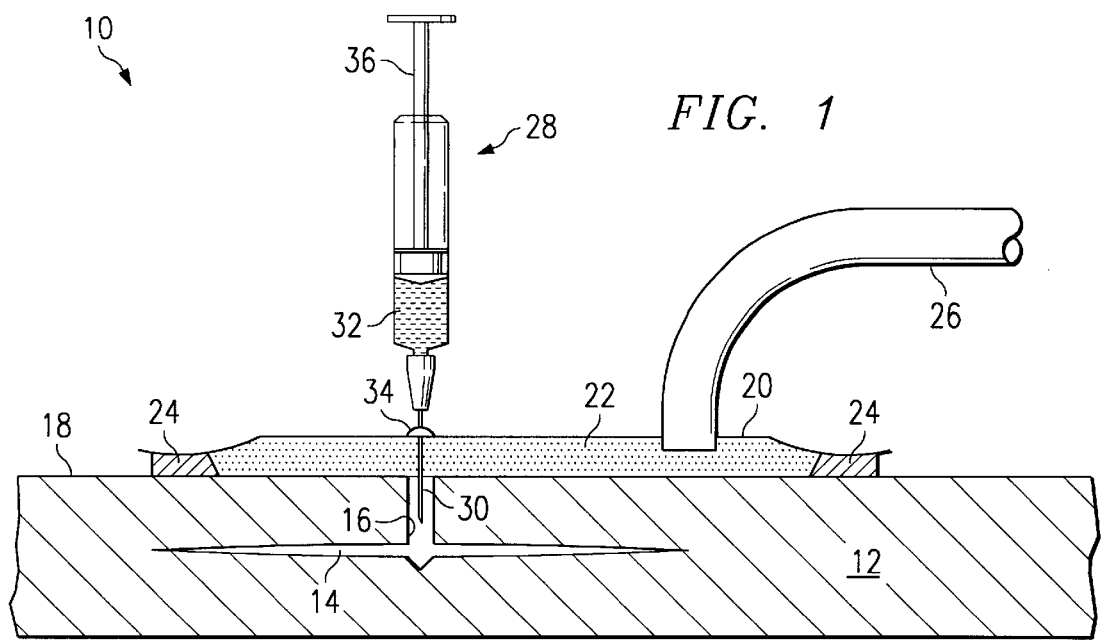
FIG. 1 is a cross-section of a composite material repair set-up according to teachings of the present invention.
Figure 2:
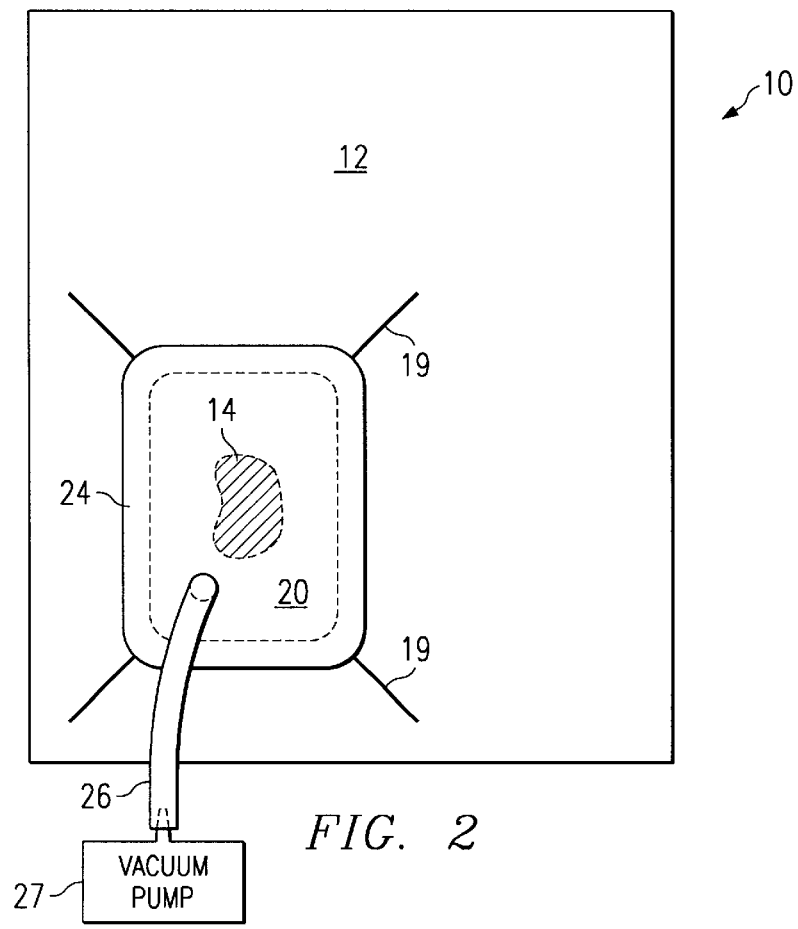
FIG. 2 is a plan view of portions of the composite material repair set-up of FIG. 1.
Figure 3:
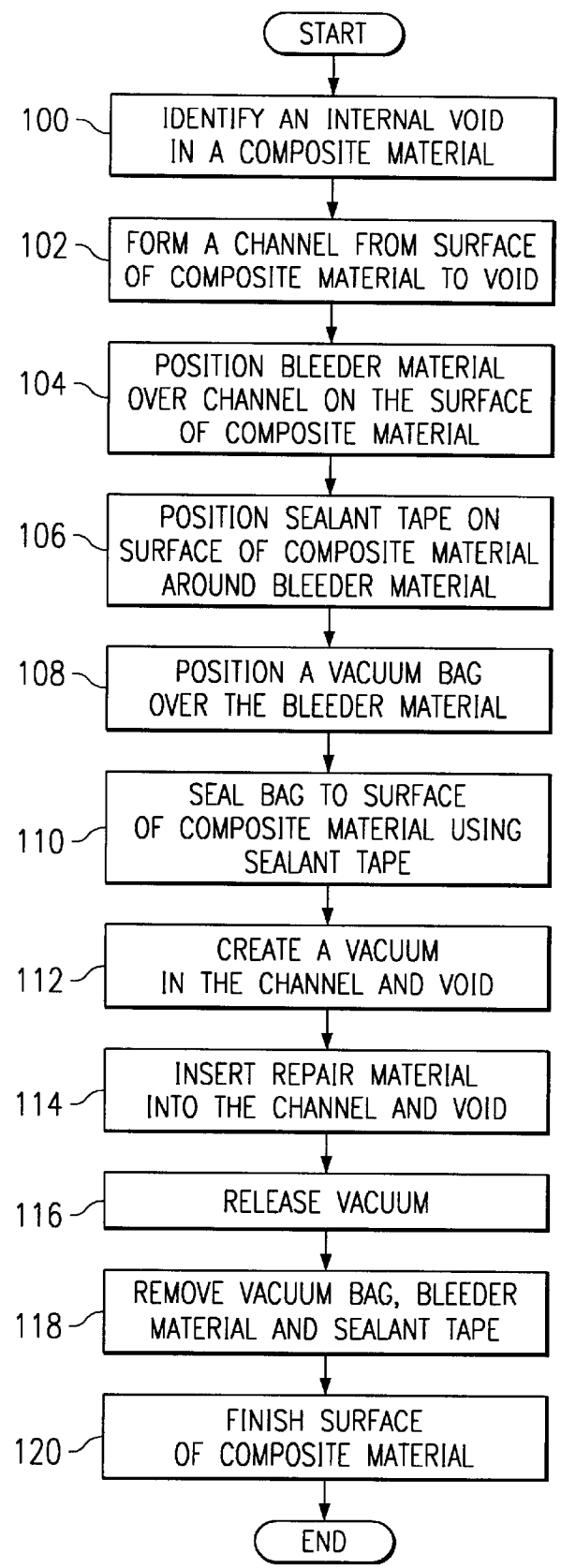
FIG. 3 is a flowchart illustrating a method of composite material repair according to teachings of the present invention.

The present invention and its advantages are best understood by referring now in more detail to FIGS. 1 through 3 of the drawings.

FIGS. 1 and 2 illustrate cross-sectional and plan views, respectively, of a composite material repair set-up 10 according to one embodiment of the present invention. FIG. 3 is a flowchart illustrating a method of composite material repair according to one embodiment of the present invention. FIGS. 1–3 will be described together. Set-up 10 includes a composite material 12 having an internal void 14. Void 14 may have been formed during the formation of composite material 12. For example, void 14 may have been formed due to the failure of two layers of composite material to bond together in the area at which void 14 is located. Alternatively, void 14 may have been formed due to delamination between two layers of composite material 12. Such delamination may be caused by impact to composite material 12. The term "void" indicates any type of defect forming a cavity in composite material 12, whether it be an air inclusion formed during the fabrication of material 12, a interlaminar defect formed due to impact or other stress, or any other cause of a cavity within material 12. In addition, the present invention may be used in conjunction with composite materials formed using any appropriate fabrication process.

The presence of void 14 in composite material 12 causes weakness in material 12 and may lead to a failure of material 12. Therefore, it is preferable that void 14 be filled to strengthen material 12. Before void 14 is repaired by filling, the location thereof is identified at step 100 of the method illustrated by the flowchart of FIG. 3 using ultrasonic equipment or any other appropriate method. After the location of void 14 is identified, a channel 16 is formed at step 102 that extends from a surface 18 of material 12 to void 14. Channel 16 is typically formed by drilling through material 12 or by any other appropriate method. Channel 16 intersects void 14 at any point; however, it is preferable that channel 16 intersects void 14 near the center thereof.

When appropriate, channel 16 is cleaned to remove any loose material. The location of channel 16 is then identified by drawing lines 19 (illustrated in FIG. 2) on surface 18 of composite material 12 that intersect with the channel 16. Lines 19 are needed to identify the location of channel 16 when the channel cannot be seen through the bleeder material 22 as described below. The channel locations lines 19 should be long enough to extend past the area of surface 18 that will be covered by bleeder material 22. Alternatively, any other appropriate method of marking or otherwise determining the location of channel 16 are also included within the scope of the present invention.

After channel 16 has been formed through composite material 12, preparations are made to create a vacuum in void 14. In the illustrated embodiment, a vacuum bag setup is used to create a vacuum in void 14. In this setup, bleeder material 22 is placed over channel 16 on surface 18 at step 104. Bleeder material 22 is a thick, felt-like cloth that absorbs excess repair material 32, described below. Bleeder material 22 also functions as a breather, providing a continuous air path for creating the vacuum in void 14. Overlaying the bleeder material 22 is a vacuum bag 20. Bag sealant tape 24 is placed around bleeder material 22 at step 106. Sealant tape 24 is a putty-like material that is used to create a seal between vacuum bag 20 and surface 18.

Vacuum bag 20, which is typically a thick plastic material, is placed over bleeder material 22 at step 108 and is pressed in contact with sealant tape 24 at step 110. By pressing vacuum bag 20 against sealant tape 24, a seal is formed between bag 20 and surface 18. Alternatively, sealant tape 24 is attached to vacuum bag 20, and then the bag and sealant tape 24 are pressed against surface 18. Although the present invention encompasses using any thickness of material for the vacuum bag, the vacuum bag 20 preferably has a thickness of at least 0.5 millimeters.

As illustrated in FIGS. 1 and 2, a vacuum hose 26 is inserted through vacuum bag 20. Vacuum hose 26 is inserted through vacuum bag 20 by means of a vacuum port or any other appropriate method. A vacuum pump 27 (illustrated in FIG. 2) is attached to the vacuum hose 26 to draw or pull a vacuum through bleeder material 22 in void 14 and channel 16 at step 112.

To locate channel 16 (either before or after forming the vacuum) a straight edge is aligned with lines 19 such that the parts of the lines obscured by the bleeder material 22 can be re-drawn on top of the vacuum bag. The point at which these re-drawn lines intersect should indicate the location of channel 16, which is not visible through the vacuum bag and the bleeder material. Again, any other appropriate method of locating channel 16 is encompassed by the present invention.

After locating channel 16, a syringe 28 is used to inject a repair material 32, such as a resin or any other appropriate material, through channel 16 into void 14 at step 114. A needle 30 attached to the syringe is inserted into the channel 16 to inject the repair material. The needle 30 is long enough to pierce bag 20 and bleeder material 22 and enter channel 16, and has an inside diameter sufficient to allow the flow of repair material 32 into the void 14. In one embodiment of the invention, a needle having an inside diameter of 1.0 millimeters is used, however the invention is not limited to any one needle diameter.

Before inserting needle 30 through vacuum bag 20 and bleeder material 22, a small amount of repair material 32 may be ejected through the needle to ensure that no air bubbles are contained in the repair material inside the syringe 28. In addition, it is preferable that a small amount of repair material 32 be ejected on top of vacuum bag 20 at the point at which needle 30 is to be inserted through the vacuum bag. This forms a small bead 34 of repair material on the surface of vacuum bag 20 thereby providing a seal to prevent air leakage around the needle 30 when inserted through bag 20.

To fill void 14, needle 30 is inserted through bead 34, vacuum bag 30 and bleeder material 22 into channel 16. As a result of the previously pulled vacuum in void 14 and channel 16, repair material 32 is drawn into void 14 from syringe 28. When the repair material begins to fill channel 16 after filling void 14, vacuum pump 27 may be shut off at step 116, allowing the vacuum head to release gradually. Slight pressure is applied to a plunger 36 of syringe 28 until repair material 32 overflows into the bleeder material 22. Pressure is applied to overcome the friction of plunger 36 in syringe 28 and to cause repair material 32 to flow into void 14 and channel 16. When the vacuum head is released, atmospheric pressure drives the resin into any remaining unfilled regions of void 14. If a sufficient vacuum has been pulled in void 14 and channel 16, these areas will be completely filled with repair material 32.

When the vacuum head has been released, the injection process is complete. Needle 30 is removed from channel 16, and vacuum bag 20, bleeder material 22 and tape 24 are removed from surface 18 at step 118. If appropriate, the repair material 32 that fills void 14 and channel 16 may be hardened by curing. Furthermore, any excess repair material 32 coming out of channel 16 onto surface 18, may be sanded or otherwise removed from surface 18 at step 120.

The method of the present invention results in a very high percentage of void 14 being filled with repair material 32. It has been found through experimentation that there is an approximately one-to-one correlation between the percentage of air evacuated from void 14 and the percentage of the void volume that is filled with repair material when using the present invention. Therefore, if a sufficient vacuum is drawn in void 14 and channel 16, these areas will be almost completely filled with repair material 32. For example, a typical two-stage vacuum pump will evacuate more than 99.9% of the air inside of void 14 and channel 16. In this example, since 99.9% of the air is evacuated from void 14 and channel 16, approximately 99.9% of void 14 and channel 16 will be filled with repair material after the process is complete. Since virtually all of the air molecules are removed from void 14 and channel 16 before repair material injection begins, there is virtually no air entrapment in void 14 and channel 16. This ensures that composite material 12 will regain the greatest possible amount of strength after the repair process is complete. In addition, since the process described above requires only one channel 16, the loss of material strength caused by the repair process is minimized.

Although the present invention has been described with selected embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for repairing a composite material having a hidden internal void, comprising:
   locating the hidden internal void;
   forming a single channel extending from a surface of the composite material to the hidden internal void;
   pulling a vacuum in the internal void through the single channel; and
   inserting a repair material through the channel into the internal void.

2. The method of claim 1, wherein forming a single channel comprises drilling a single channel from the surface of the composite material to the hidden internal void.

3. The method of claim 1, wherein forming a single channel comprises forming a single channel that enters the hidden internal void near the approximate center of the internal void.

4. The method of claim 1, further comprising marking the surface of the composite material to indicate the location of the channel.

5. A method for repairing a composite material having a hidden internal void, comprising:
   identifying the location of the hidden internal void;
   forming a single channel extending from a surface of the composite material to the internal void;
   positioning a vacuum bag over the channel;
   forming a seal between the vacuum bag and the surface of the composite material;
   drawing a vacuum in the internal void through the channel; and
   inserting a repair material through the channel into the hidden internal void.

6. The method of claim 5, further comprising positioning a bleeder material between the surface of the composite material and the vacuum bag.

7. The method of claim 5, wherein inserting a repair material through the channel into the hidden internal void comprises:
   inserting a needle of a syringe containing the repair material through the vacuum bag into the channel; and
   allowing the repair material to be drawn into the internal void through the channel.

8. The method of claim 7, further comprising:
   positioning a bead of repair material on the vacuum bag over the channel; and
   inserting the needle of the syringe through the bead of repair material.

9. The method of claim 7, further comprising:
   releasing the vacuum from the internal void and the channel when the repair material begins to fill the channel from the internal void; and
   applying pressure to a plunger of the syringe to ensure that the void and the channel are substantially filled with the repair material.

10. A method for repairing a composite material having a hidden internal void, comprising:
    scanning the composite material to locate the hidden internal void;
    forming a single channel extending from a surface of the composite material to the hidden internal void;
    cleaning the channel to remove loose materials;
    positioning a vacuum bag over the channel;
    forming a seal between the vacuum bag and the surface of the composite material;
    drawing a vacuum in the internal void through the channel; and
    injecting a repair material through the vacuum bag and the channel into the hidden internal void.

11. The method of claim 10 further comprising marking the location of the channel on the composite material; and
    positioning a bleeder material between the surface of the composite material and the vacuum bag.

12. The method of claim 11 further comprising releasing the vacuum from the vacuum bag; and
    driving the repair material into the hidden internal void through the channel by atmospheric pressure.

* * * * *